May 18, 1965 R. J. LEE ETAL 3,184,517
ALKYLATION PROCESS FOR PREPARING PROPYLBENZENES
Filed Jan. 17, 1962
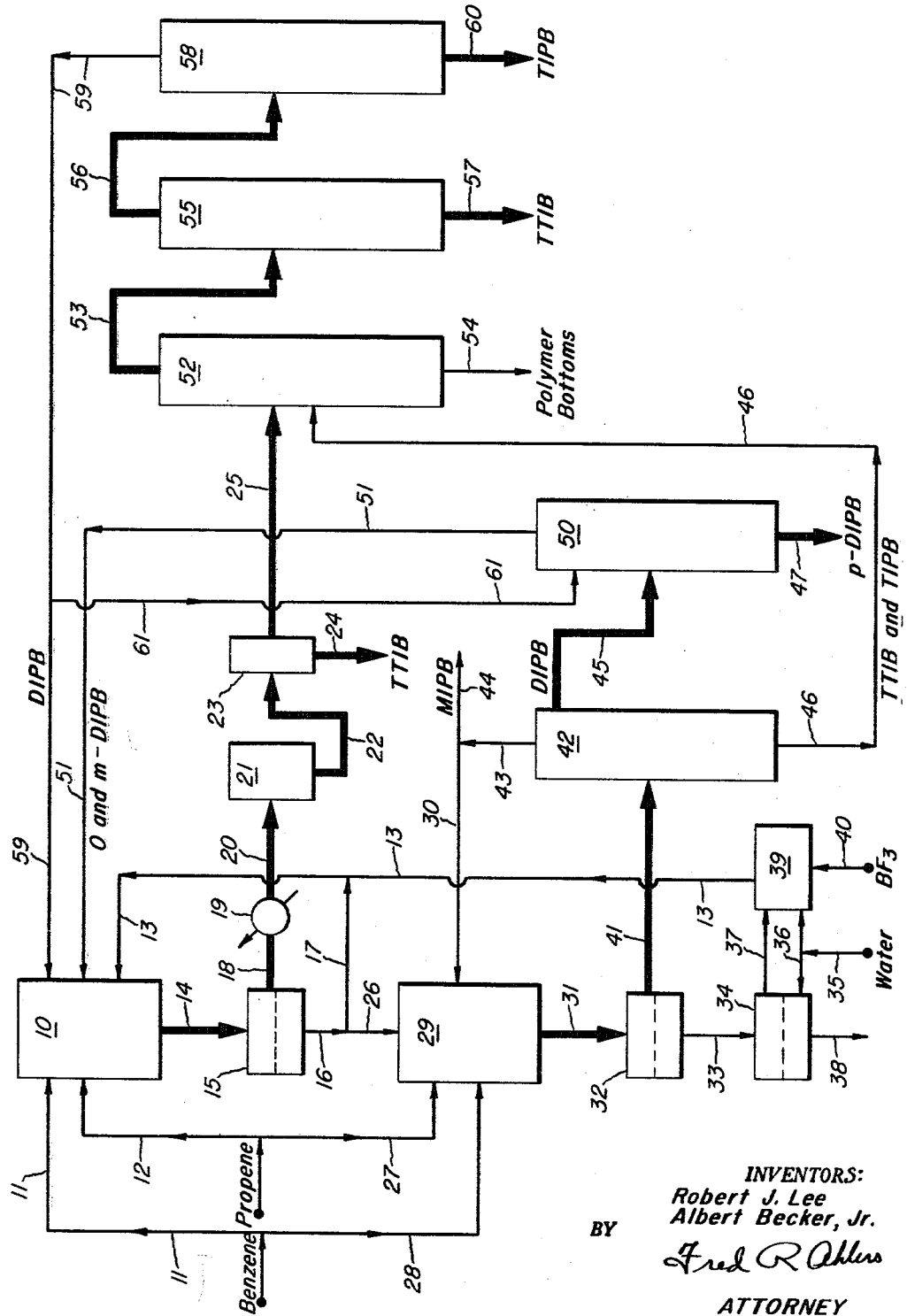
INVENTORS:
Robert J. Lee
Albert Becker, Jr.
BY
Fred R Ahlers
ATTORNEY

United States Patent Office 3,184,517
Patented May 18, 1965

1

3,184,517
ALKYLATION PROCESS FOR PREPARING PROPYLBENZENES
Robert J. Lee, Dolton, Ill., and Albert Becker, Jr., Midland, Mich., assignors to Standard Oil Company, Chicago, Ill., a corporation of Indiana
Filed Jan. 17, 1962, Ser. No. 168,308
9 Claims. (Cl. 260—671)

This invention relates to the propylation of benzene and more specifically pertains to a process for providing p-diisopropylbenzene by the propylation of benzene or a mixture of benzene and cumene and to an integrated process and system therefor for the concurrent production of p-diisopropylbenzene and tetraisopropylbenzene and, if desired, 1,3,5-triisopropylbenzene and cumene, by the propylation of benzene.

Many processes have been proposed for the propylation of benzene in the presence of aluminum chloride, hydrogen fluoride, boron trifluoride, silica alumina, or supported phosphoric acid as catalysts to produce cumene, m-diisopropylbenzene, p-diisopropylbenzene or combinations thereof or 1,3,5-triisopropylbenzene. The process employing supported phosphoric acid catalyst for the preparation of diisopropylbenzenes require the use of conditions such as pressures in the range of 100 to 300 p.s.i.g. and temperatures above 250° C. Such processes result in the production of about 20 to 25 mole percent diisopropylbenzene per pass based on benzene or cumene charged with only about 30 to 40 percent by weight of the diisopropylbenzene fraction being the para-isomer. The process employing the silica alumina catalyst produce at 100–300 p.s.i.g. and above 250° C. also about 20 to 25 mole percent diisopropylbenzenes per pass but the para-isomer content is higher, in the range of 50 to 53% by weight. By proper control of ratio of reactants, catalyst concentration, etc. diisopropylbenzenes can be prepared from benzene and cumene with propylene in the presence of aluminum chloride with a higher than equilibrium concentration of diisopropylbenzene. Aluminum chloride can also be employed effectively for the propylation of benzene to prepare 1,3,5-triisopropylbenzene.

Cumene is useful as a blending component for motor fuel. Terephthalic acid, a raw material used indirectly in the preparation of polyethylene terephthalate for film and fiber production, can be prepared by the catalytic liquid phase oxidation of p-diisopropylbenzene with air. Trimesic acid also can be prepared by the oxidation of 1,3,5-triisopropylbenzene. A source of pyromellitic acid or its dianhydride could be available from the oxidation of 1,2,4,5-tetraisopropylbenzene.

An integrated process and system therefor has been devised for the production of p-diisopropylbenzene, 1,3,5-triisopropylbenzene, 1,2,4,5-tetraisopropylbenzene, and, if desired, cumene hereinafter referred to as p-DIPB, TIPB, TTIB and MIPB respectively. If cumene is not a desired product, all that is produced can be recycled without disadvantage. This process employs for the propylation of benzene and propylated benzene recycle streams a unique catalyst comprising essentially boron trifluoride monohydrate, $BF_3 \cdot H_2O$. The integrated process consists of two propylation zones, each operated under different conditions of rate of charging the reactants. The process is unique in that suitable temperatures are in the range of from −30 to 125° C., desirably in the range of 0 to 100° C. To the first propylation zone benzene and a recycle diisopropylbenzene fraction lean in p-diisopropylbenzene is charged with a propene stream and boron trifluoride monohydrate ($BF_3 \cdot H_2O$) containing catalyst in an amount of 0.25 to 1.0 mole of catalyst per mole of aromatic hydrocarbon. While temperatures in the range of 0 to 100° C. are desirable, it is preferred to carry out

2 the reaction in the first propylation zone at 25 to 75° C. with a slow rate of addition of propene. Suitably propene can be added at a rate of less than 5 moles per hour, desirably 0.5 to 3.0 moles, and preferably 1 to 2 moles per hour to provide a ratio of propene to benzene of at least 4 to 1 or above. When a mixture of benzene aromatics: benzene, diisopropylbenzenes, and/or cumene is present, there should be provided a molar ratio of at least 4 to 1 of propene affording groups (propene plus isopropyl group) per mole of benzene aromatics. The reactant retention time in the first propylation zone desirably is in the range of 1 to 35 hours, preferably in the range of 5 to 10 hours. In this propylation zone yields of TTIB of up to 45 mole percent are obtainable.

In the second propylation zone, the same catalyst concentrations are employed but it is preferred to use as the boron fluoride monohydrate containing catalyst $BF_3 \cdot H_2O$ with 2 to 15% acid soluble oils such as the $BF_3 \cdot H_2O$ separated from the first propylation zone reaction mixture, or $BF_3 \cdot H_2O$ with a diolefin such as 2,5-dimethylhexadiene-2,4, or $BF_3 \cdot H_2O$ with about 5 to 15% additional water, that is boron fluoride hydrate containing 25 to 40% water.

It has been found that benzene or cumene can be alkylated in the first propylation zone with propylene using a $BF_3 \cdot H_2O$ catalyst (in an amount ranging from 1:4 to 1:1 catalyst to hydrocarbon starting charge ratio) to form tetraisopropylbenzene in 39–45 mole percent yields at 25–75° C. A major amount of the tetraisopropyl compound will crystallize out of the reaction mixture after it has been cooled to room temperature, about 25° C., and can be filtered off, and the remaining reaction product recycled to the reactor for realkylation or first distilled to remove di- and triisopropylbenzenes leaving polymer bottoms and the diisopropylbenzenes distilled from the triisopropylbenzene for recycle to the first propylation zone. All of the first propylation zone product may be distilled to separate di-, tri- and tetraisopropylbenzene products. If the reaction time is increased by lowering the rate of propylene entry, the polymer buildup is greatly decreased. However, the tetra-isomer can be formed in equally high mole percent in short reaction periods using a high propylene admission rate, but the polymer buildup is increased to the point that subsequent crystallization of the product from the mixture is difficult due to the solubility of the product in the polymer. In the absence of excessive amounts of polymer, more than about 50% of the tetraisopropylbenzene can be crystallized out at temperatures below 25° C. down to about 0° C. or lower.

In the production of para-diisopropylbenzene, it has been found that the $BF_3 \cdot H_2O$ catalyst which has had its activity decreased by previous use or premodification (with acid oil forming components) gives the highest yields of the para-isomer (up to 36.5 mole percent yield, and 57 weight percent of the diisopropyl fraction). This is done by admitting the propylene into the reactor at a very high rate as fast as it can be consumed, and for a short reaction or contact time desirably at temperatures of 25 to 75° C. and preferably at 50–75° C. These yields are considerably higher than found in the literature pertaining to the production of para-diisopropylbenzene using other acid catalysts. The use of fresh $BF_3 \cdot H_2O$ gave a somewhat lower yield of the para-isomer; consequently, it is preferred to employ a "used $BF_3$-hydrate" catalyst (i.e., containing 2 to 15% of acid soluble oils or modified as hereinbefore disclosed) for the reaction stage wherein there is produced para-diisopropylbenzene.

The following is illustrative of the alkylations of this invention in each of the propylation zones. In all the alkylations the procedure used is as follows.

The reaction flask was tared and the desired amount of benzene or cumene and catalyst added. The flask was then placed in the bath and the required fittings attached. The stirrer was started and propylene was admitted through the inlet tube, its rate being controlled by the flowmeter or off-gas in the case of high entry rates. The desired reaction temperature was maintained by the water and ice bath or steam. After the reaction was stopped, the contents of the reaction flask were transferred to a separatory funnel where the catalyst layer separated out and was drawn off. The hydrocarbon layer was then passed through a column packed with Floridan clay and washed through with n-pentane. This was found to be a much faster and simpler procedure for removal of traces of $BF_3$ from the reaction product, than caustic and water washing followed by drying over Drierite.

The products were then fractionated, usually on a 3 ft. x 25 mm. Podbielniak Hypercal column at 10:1 reflux ratio. Cuts were taken, which would contain the mono-, di-, tri- and tetraisopropylbenzene isomers, and samples of these cuts were then analyzed by infra-red for the content of the desired products.

FIRST PROPYLATION ZONE—PREPARATION OF TTIB

The conditions for producing TTIB are, of course, considerably different than those which give optimum yields of p-DIPB. The introduction of four isopropyl groups requires the use of a more active catalyst, longer reaction times and generally a higher reaction temperature. At the same time, the competing reaction of propylene polymerization becomes more of a problem when attempting to alkylate to the tetraisopropyl stage.

TTIB is a high melting point (119° C.) solid. Literature data indicate that this is the 1,2,4,5-isomer and that this is the only tetraisopropylbenzene isomer which can be prepared. This can be confirmed by molecular models, which readily demonstrate that steric interference is so great that it is almost impossible to assemble any other tetraisopropyl-isomer. Properties of the 1,2,4,5-tetraisopropylbenzene are shown in Table I.

Table I
PHYSICAL PROPERTIES OF TETRAISOPROPYL-BENZENE

| | |
|---|---|
| Color and form | White crystals, slight characteristic odor, will sublime. |
| Melting pt. found | 119.5–120° C. |
| Literature values | 117–119.5° C. |
| Boiling pt., pure material | 260° C. at 760 mm. |
| Boiling pt., crude concentrate | 253–265° C. |
| Solubility in: | |
| Water | Insoluble. |
| Methanol | 1.2 g./100 ml. at 8° C. |
| Ethanol | 1.33 g./100 ml. at 25° C. |

The amounts of materials employed, the reaction conditions, and the results obtained are shown in Table II below.

Table II
PREPARATION OF 1,2,4,5-TETRAISOPROPYLBENZENE

| Run | 1 | 2 | 3 | 4 |
|---|---|---|---|---|
| Reaction conditions: | | | | |
| Moles of aromatic | 11.25 benzene | 2.14 cumene | 7.8 cumene | 6.5 cumene. |
| Catalyst | $BF_3 \cdot H_2O$ | $BF_3 \cdot H_2O$ (modified) | $BF_3 \cdot H_2O$ | $BF_3 \cdot H_2O$. |
| Cat./HC | 1.0:1 | 0.78:1 | 07.78:1 | 0.27:1. |
| Moles $C_3^=$ | 44.0 | 7.6 | 56.7 | 62.2. |
| Time, hours | 35 | 1 | 2.3 | 6. |
| Temperature, °C | 30 | 58 | 60 | 65. |
| $C_3^=$ Rate, mole/hr | 1.2 | Very high (in excess) | | |
| Products, mole percent on aromatic charge: | | | | |
| Cumene | 4.2 | 5.6 | | |
| Total— | | | | |
| Diisopropylbenzene | 4.5 | 7.95 | 18 | 13. |
| Triisopropylbenzene | 31.8 | 16.3 | 27 | 28. |
| Tetraisopropylbenzene | 39.0 | 18.7 | 44 | 45. |
| Polymer bottoms, wt. percent | 9.4 | 56.0 | 44 | 43.5. |

Cumene, the diisopropylbenzene and triisopropylbenzene, may be recycled to the first propylation zone or the triisopropylbenzene can be recovered as product. The cumene may be charged to the second propylation zone.

*Effects of reaction time and propylene entrance rate.*— By comparing run 1 with run 3 or 4 in Table II, the effects of these factors will be noticed. In run 1 the propylene was admitted very slowly for a long reaction period while in run 3 the converse was done. The short time and fast entry gave a slight increase in tetra yield (44 mole percent as compared to 39); however, the real difference lies in the product distribution and ease of recovery of the solid tetraalkylated product. The short reactions gave a much higher percentage of polymer and alkymer bottoms. This was believed to be due to the high excess of propylene in the presence of the slow reacting, higher alkylated benzenes; in which case, polymerization was the predominant reaction over the alkylation. This results in poor utilization of the propylene, contamination of the product with propylene polymers, and more difficulty in recovering the tetraisopropylbenzene product.

*Effect of temperature.*—Temperatures were studied over the range of 30 to 70° C. This factor seemed to have very little, if any, effect on the yield in the reaction as shown by Table II. There is an indication that the higher temperatures may hold a slight advantage. It is expected that if used catalyst were recycled, the higher temperatures (60 to 125° C.) would be required for best results.

*Catalyst.*—The type of catalyst was the second major factor in the preparation of the tetraisopropylbenzene. In Table II, it can be seen by comparing run 2 with run 3 or 4, that the fresh $BF_3 \cdot H_2O$ is 2.5 times more effective in producing the tetra-isomer than the diolefin modified $BF_3$-hydrate catalyst. It can be seen that the amount of polymeric products increased considerably when using the modified catalyst, and the yield of tri- and tetraalkylated product was substantially lower than was obtained with the straight $BF_3 \cdot H_2O$ catalyst. This is probably due to the fact that the modified catalyst has had its activity decreased almost to the point at which it has not the ability to cause the fourth isopropyl group to enter the benzene ring. As a result, polymerization rather than alkylation occurs.

Another point of interest in comparing runs 1, 3 and 4 is the effect of the quantity of catalyst. A catalyst/hydrocarbon ratio as low as 1:4 is apparently as effective as a ratio of 1:1.

*Recovery of the tetraisopropylbenzene.*—When the reaction products are cooled to room temperature, about 50% of the tetra formed (M.P. 119° C.) crystallizes and can be readily separated as for example by filtration, centrifugation, decantation, or similar means for separating solvents from liquids. The solubility of the tetra in the triisopropylbenzene and higher boiling fractions is about 20 g./100 g. solvent at 25° C. Lowering the temperature to −15° C. crystallizes more of the tetra out of solution but the occluded polymer is very difficult to wash from the crystals and therefore this cooling to low temperatures offers no real advantage in the recovery. The 50% of tetra remaining in solution is recovered by distillation. Recovery of the tetra product from the distillation concentrate usually also requires some filtering and washing, depending on the efficiency of the column and the amount of polymer which is present. The tetra product (B.P. 260° C.) begins coming overhead about 253° C. and continues through about 265° C. at atmospheric pressure. Reduced pressure fractionation may be employed if desired.

SECOND PROPYLATION ZONE—PREPARATION OF p-DIPB

The amounts of materials employed, the reaction conditions, and the results obtained are shown in Table III below.

adding 2,5-dimethylhexadiene-2,4 or other diolefins. The comparison of typical runs using these modified catalysts is given in Table III. The diolefin modification clearly gives an increase in the para yield of the alkylation product. This increase in yield is believed to be due to a decrease in activity of the $BF_3$-catalyst. It is assumed that the second isopropyl group initially enters the benzene ring in the para position, but that this is rapidly isomerized to the meta position by the highly active $BF_3 \cdot H_2O$ catalyst. However, this assumption was never confirmed. Modification of the catalyst to reduce its activity is one of the keys in making improved yields of the para-isomer.

*Alkylation using other catalysts.*—Comparative runs were made using several other acid catalysts for the liquid phase propylation of benzene or cumene. Filtrol clay, sulfuric acid and toluene sulfonic acid were tested in several isolated experiments. The results are given in Table IV. The clay catalyst gave a good yield of di- and triisopropyl-benzenes, but the para-isomer content of the di- fraction was only 39. It was hoped that this clay would be a milder catalyst which would give a higher yield of the para-isomer. However, this did not prove to be the case, possibly because of the higher temperature (160° C.) required for the reaction.

*Table III*
PREPARATION OF 1,4-DIISOPROPYLBENZENE

| Run | 5 | 6 | 7 | 8 | 9 |
|---|---|---|---|---|---|
| Reaction conditions: | | | | | |
| Moles of aromatic | 2.25 benzene | 2.25 benzene | 3.34 benzene | 2.78 benzene | 2.85 cumene. |
| Catalyst | $BF_3 \cdot H_2O$ | $BF_3 \cdot H_2O$ | Modified [1] | Modified [2] | Modified [1]. |
| Cat./HC ratio | 1.0:1 | 1.0:1 | 0.75:1 | 1.0:1 | 0.57:1. |
| Moles $C_3^=$ | 5.7 | 3.5 | 6.7 | 5.5 | 3.2 |
| Time, hours | 2.75 | 1.4 | 2.7 | 12.0 | 0.3. |
| Temperature, ° C | 34 | 35 | 36 | 30 | 65. |
| $C_3^=$ rate, mole/hr | 2.4 | 2.4 | 2.4 | 0.5 | Very high (in excess). |
| Products, mole percent on aromatic charge: | | | | | |
| Benzene | | 11.6 [3] | | | |
| Cumene | 41.0 | 53.7 | 13.5 | 59.0 | 4.4 [3]. |
| Total—Diisopropylbenzene | 37.8 | 23.1 | 69.5 | 34.2 | 64.5. |
| Para-diisopropylbenzene | 14.7 | 9.0 | 33.0 | 15.5 | 36.5 |
| Triisopropylbenzene | 10.6 | 6.2 | 11.4 | 1.4 | 11.9. |
| Higher (wt. percent) | 13.8 | 8.0 | 3.1 | 5.0 | 15.0. |

[1] $BF_3 \cdot H_2O + 14\%$ 2,5-dimethylhexadiene-2,4.
[2] 72% $BF_3$; 28% $H_2O$.
[3] Unreacted.

*Effect of reaction time.*—Comparison of run 9 with the other runs in Table III shows the effect of time on yield and product distribution in the preparation of para-diisopropylbenzene. The maximum yield is obtained in a run of twenty minutes or less and is also dependent upon propylene entry rate as will be hereinafter discussed in more detail.

*Effect of temperature.*—The use of reaction temperatures in the range of from −30° C. to 125° C. shows no outstanding gain or loss in yield of the para-isomer throughout this range, the lowest temperature giving comparable results with the highest.

The highest yield of the para-isomer was formed when an intermediate range of 50 to 65° C. was maintained. This was slightly below the point at which an exothermic reaction would sometimes occur when no cooling bath was used. With used or partially spent catalyst such as recovered from the first propylation zone, higher temperatures (100° C.) are used to maintain a rapid reaction rate.

*Catalysts.*—The catalyst of this invention is the boron trifluoride along with certain modification of it hereinbefore described. The fresh $BF_3 \cdot H_2O$ catalyst gave fairly consistent yields of the para-isomer of 40 weight percent of the diisopropylbenzene fraction. This was about the same yield as obtained by other alkylation catalysts.

By modifying the $BF_3 \cdot H_2O$ catalyst by addition of water or various diolefinic compounds, a higher yield of the para-isomer was realized. These modifications consisted of diluting the fresh $BF_3 \cdot H_2O$ further with water, or of Sulfuric acid has been studied extensively for this propylation reaction by N.V. deBataafsche Petroleum Maatschappij, e.g., as reported in U.S. Patent 2,275,312 or Belgian Patents 526,954 and 531,680. With 80% $H_2SO_4$ as catalyst, diisopropylbenzene is the major product but the reaction goes rather slowly. In this case, also the para content of the di- fraction is in the 30 to 40% range. In the one experiment carried out with toluene sulfonic acid, the product was over-alkylated since triisopropylbenzene and higher materials were the main products. For comparison, two typical experiments with $BF_3$-hydrate catalysts are given at the bottom of Table IV. The high yield (65%) of diisopropylbenzene containing 57% para-isomer, produced by the diolefin modified $BF_3 \cdot H_2O$ catalyst is certainly impressive in comparison with the other catalysts.

*Separation of para-isomer.*—The separation of a portion of high purity para-diisopropylbenzene from the mixture of isomers present in the alkylation product can be accomplished by means of efficient fractionation. This is a rather difficult separation, because the ortho and meta isomers boil at about 398° F. (203–204° C.) while the para-isomer boils at 410° F. (210° C.) However, a good separation can be made. For example, a large quantity of the mixed diisopropylbenzene fraction (prepared by propylation of cumene using the modified $BF_3 \cdot H_2O$ catalyst) is fractionated on a 3 ft. x 25 mm. Podbielniak Hypercal column at 20:1 reflux ratio taking as an overhead stream one rich in the meta-isomer but also containing some other isomer and, hence, lean in the para-isomer. From the data obtained it is found that 67% of the available para-diisopropylbenzene is separated as a bottom fraction concentrate of 96% purity. A 90% recovery of para-isomer of 93.5% purity is also indicated to be possible by taking a broader fraction. A substantial sample of 95% purity para-diisopropylbenzene was prepared by taking a fraction intermediate to that of the 93.5% purity and the 96% purity. The cumene and diisopropylbenzenes in the hydrocarbon mixture from the first propylation zone can be combined with the hydrocarbons separated from the second propylation zone or the diisopropylbenzenes from the first propylation zone can be combined with the diisopropylbenzenes fraction for the second propylation zone and the mixture fractionated to recover the p-isomer concentrate product.

*Realkylation.*—Several realkylation runs are made for the purpose of producing additional tetraisopropylbenzene from the other alkylation products after the tetra has been separated. One of these runs, a triisopropylbenzene fraction obtained from previous runs, is employed. From this charge, the tetra-isomer was formed in 30 mole percent yield. Since the 1,3,5-triisopropylbenzene cannot form the tetra-isomer because of steric hindrance, the presence of a substantial amount of this isomer in the starting charge had a limiting effect on the amount of tetraisopropylbenzene which could be produced. In some other realkylation runs, portions of the mixed alkylation product, obtained after removal of the solid tetraisopropylbenzene by filtration, are used as charge stock for another alkylation run. This crude alkylate mixture contains a considerable amount of propylene polymer which has been formed in the initial alkylation run, as indicated by high bromine numbers. As a result of this polymeric material in the charge to the realkylation run, the amount of additional tetraisopropylbenzene which could be formed and recovered by realkylation is low. It was evident that realkylation may or may not be worthwhile, depending on the aromatic isomers which are present and the amount of propylene polymers in the material available for recycle. This in turn would depend on the catalyst and alkylation conditions employed in the initial alkylation operation.

charged by way of conduits 11 and 12 respectively to reactor 10. Fresh boron trifluoride monohydrate catalyst (prepared from spent catalyst obtained from the second propylation zone as hereinafter described) is charged by way of conduit 13. Also charged to reactor 10 are diisopropylbenzene fractions not recovered as DIPB product for example, by conduits 51 and 59. The amount of propylene charged should provide about 4 moles of isopropyl group equivalent per mole equivalent of benzene. By "isopropyl group equivalent" is meant propylene as well as isopropyl groups on diisopropylbenzenes cycled to reactor 10. Likewise the "mole equivalent of benzene" takes into account the benzene charged as well as the benzene equivalents on the diisopropylbenzene cycled to reactor 10. More than about 4 moles of isopropyl group equivalents per mole equivalent of benzene can be used but would tend to add further processing steps, i.e., separation of unreacted propylene or the formation of excess propylene polymers. A catalyst ratio of about 0.25 mole per mole of hydrocarbon in reactor 10 is adequate. If more than about 4 moles equivalents of isopropyl group per mole of benzene equivalent is used, some spent $BF_3 \cdot H_2O$ catalyst can be recycled, for example, by conduits 16, 17 and 13 to prevent excessive propylene polymer formations. The rate of charging reactants is that which provides about 1.0 mole of propylene per hour. A propylation temperature of about 60° C. is employed. Reaction hold time or contact time in reactor 10 is about 6 hours. The reactor effluent is withdrawn from reactor 10 through discharge line 14 to separator 15 and the hydrocarbon layer is withdrawn therefrom through conduit 18, passed through cooler 19 to cool the hydrocarbons to 25° C. The cooled hydrocarbon mixture is withdrawn from cooler 19 by slurry transfer line 20 and charged to slurry surge vessel 21 maintained at about 25° C. Thereafter, the slurry is passed through filter 23 or a centrifuge. About one-half of the TTIB produced in reactor 10 is recovered as a crystalline filter cake product. The remainder of the TTIB produced remains dissolved in the mother liquor discharged from filter 23 or centrifuged through conduit 25 and charged to topping still 52 with a stream of TTIB and TIPB produced in the second propylation zone.

*Table IV*

COMPARISON OF SEVERAL CATALYSTS FOR THE LIQUID PHASE PROPYLATION OF AROMATICS

| Catalyst | Cat./HC | Time, hours | Temp., °C. | Products (mole percent on aromatic charge) | | | | Percent para in diisopropylbenzine fraction |
| --- | --- | --- | --- | --- | --- | --- | --- | --- |
| | | | | Cumene | Diisopropyl-benzene | Triisopropyl-benzene | Polyisopropyl-benzene, wt. percent | |
| Filtrol #22 Clay | 0.26:1 (cumene) | 4.0 | 160 | 14.3 | 38.0 | 31.7 | 6.9 | 39 |
| $H_2SO_4$(96%) (Texas City) | 1.03:1 (benzene) | 5.0 | 50 | 23.2 | 24.8 | | 18.0 | |
| $H_2SO_4$(88.2%) (Belg. Pat. 531,680) | 0.83:1 (cumene) | 5.25 | 50 | 48.2 | 32.4 | 5.3 | 4.4 | ¹ (30–40) |
| Toluene sulfonic acid | 1.07:1 (cumene) | 5.5 | 165 | | 0.7 | 61.3 | 35.5 | |
| $BF_3 \cdot H_2O$ | 1:1 (benzene) | 2.75 | 34 | 41.0 | 37.8 | 10.6 | 13.8 | 39 |
| $BF_3 \cdot H_2O$ modified | 0.57:1 (cumene) | 0.33 | 65 | 4.4 | 64.5 | 11.9 | 15.0 | 57 |

¹ Estimated.

The various alkylation reactions, the effects of reaction time, rate of charging propylene, the type of catalyst employed in the first and second propylation zones and the recovery techniques have been hereinbefore separately demonstrated. The integrated process and system therefore can be illustrated with reference to the accompanying schematic flow drawing. In this integrated process, the reaction and conditions employed in what was hereinbefore referred to as "first propylation zone" are employed in reactor 10, and the reaction and conditions employed in what was referred to as "second propylation zone" are employed in reactor 29.

Benzene and propylene from storage (not shown) are

To reactor 29 there is charged propylene and benzene from their source (not shown) through conduits 27 and 28 respectively. Used $BF_3 \cdot H_2O$ catalyst from separator 15 is charged through conduits 16 and 26 to reactor 29. The mole ratio of propylene to benzene charged to reactor 29 is about 2 to 1 plus about one mole of propylene per mole of cumene recycle charged by conduit 30. The reaction temperature is about 100° C., the catalyst to hydrocarbon ratio is about 1 to 1.3 on a mole basis, the contact time in reactor 29 is about 20 minutes and propylene is charged into the liquid in this reactor as rapidly as absorbed; i.e., no pressure buildup. The effluent is discharged from reactor 29 through discharge conduit 31 to second separator 32. Hydrocarbon layer forming in second separator 32 is withdrawn by conduit 41 to still 42. Spent catalyst is withdrawn from second separator 32 by conduit 33 to acid-oil separator 34 and combined with water added by conduits 35 and 36 in an amount to provide a diluted water solution containing 50 to 65% BF$_3$. The acid-oils form a lower layer which can be withdrawn through conduit 38. The dilute aqueous BF$_3$ solution is charged through conduit 37 to fresh catalyst preparation vessel 39 and fortified with BF$_3$ to a concentration corresponding to BF$_3$·H$_2$O. This fresh catalyst is withdrawn as needed through conduit 13 and charged to reactor 10.

The hydrocarbons charged to still 42 are fractionated to obtain a cumene overhead stream withdrawn through conduit 43 and split into product stream 44 and recycle stream in conduit 30. A diisopropylbenzene fraction is withdrawn and charged by conduit 45 to diisopropylbenzene fractionator 50 where an overhead o- and m-diisopropylbenzene fraction (about 400–402° F.) is taken and cycled by conduit 51 to reactor 10. In the hydrocarbon mixture in conduit 41 there is about 65 to 70 mole percent diisopropylbenzenes based on benzene and cumene charged of which about one-half is p-DIPB. A bottoms fraction containing TIPB, TTIB (about 14–15 mole percent based on benzene and cumene charged) is removed by conduit 46 and charged to topping still 52.

A high purity p-DIPB bottom fraction is withdrawn from diisopropylbenzene fractionator 50.

In topping still 52, all materials boiling up to about 265° C. are taken as an overhead stream leaving higher boiling materials, mainly polymers and tars as still bottoms removed by conduit 54. The overhead fraction (to 265° C.) is taken by conduit 53 to fractionator 55 wherein TIPB and any diisopropylbenzenes are taken as overhead and TTIB (the remaining one-half produced in reactor 10 plus any made in reactor 29) is taken as a bottoms product. The overhead stream for fractionator 55 is taken by conduit 56 to TIPB recovery tower 58 where the diisopropylbenzenes are stripped and cycled to reactor 10 by conduit 59 or even fed to diisopropylbenzene fractionator 50 by conduit 61. The bottoms fraction from recovery tower 58 is withdrawn through TIPB product line 60.

The foregoing process can be operated under such conditions that the hydrocarbon effluents from either the first or the second propylation zones as substantially free from unreacted propylene and can be readily operated on a continuous basis by providing the the reactor hold or contact times hereinbefore disclosed. Reactor 29 can be sized to produce p-DIPB at any desired rate since the contact time therein is relatively short. The conversion of benzene equivalents in reactor 29 to diisopropylbenzenes (65 to 70%) is high and up to 36.5 mole percent p-DIPB based on benzene equivalents may be obtained.

What is claimed is:

1. A process for the concurrent preparation and recovery of p-diisopropylbenzene and tetraisopropylbenzene by the propylation of benzene in a first and second propylation zone comprising conducting the benzene propylation in said first zone in the presence of fresh BF$_3$·H$_2$O in an amount of from 0.25 to 1.0 mole per mole of aromatic hydrocarbon at a temperature in the range of from 0 to 100° C. with about 4 moles of isopropyl affording group reactant per mole equivalent of benzene reactant, feeding to said first zone propylene at a rate of less than 5 moles per hour and providing a contact time in said first zone of from about 1 to 10 hours; conducting in said second zone the propylation of benzene in the presence of modified BF$_3$·H$_2$O catalyst, selected from the class consisting of a BF$_3$·H$_2$O catalyst in addition with acid soluble oils, a BF$_3$·H$_2$O catalyst in addition with a diolefin, and a

BF$_3$·H$_2$O catalyst diluted with additional water, in the ratio of 0.25 to 1.0 mole per mole of aromatic hydrocarbon at a temperature in the range of 25 to 75° C. with a mole ratio of isopropyl affording group in the range of about 1 to 2 per mole equivalent of benzene and feeding propylene to said second zone at such a propylene feed rate that there is no pressure buildup within said propylation zone; withdrawing the mixture of hydrocarbon and catalyst from said first propylation zone; separating from said first propylation mixture a stream containing BF$_3$·H$_2$O and a first hydrocarbon stream; separating from said first hydrocarbon stream at least tetraisopropylbenzene and polymeric materials boiling above tetraisopropylbenzene; recycling to said first propylation zone at least a portion of the hydrocarbons from said first hydrocarbon stream, boiling below tetraisopropylbenzene; withdrawing from said second propylation zone a second mixture containing hydrocarbons and modified BF$_3$·H$_2$O catalyst; separating said second propylation zone mixture into a modified BF$_3$·H$_2$O containing stream and a second hydrocarbon stream; distilling a cumene fraction and a diisopropylbenzene fraction from said second hydrocarbon stream leaving as a bottom fraction hydrocarbons boiling above the diisopropylbenzene fraction; recycling at least a portion of the cumene to said second propylation zone; fractionating said diisopropylbenzene fraction to remove as a low boiling fraction a mixture lean in p-diisopropylbenzene and rich in m-diisopropylbenzene and also containing o-diisopropylbenzene leaving a p-dissopropylbenzene fraction containing from 93.5 to 96% para-isomer; and cycling the fraction lean in para-isomer to said first propylation zone.

2. The process of claim 1 wherein a major portion of tetraisopropylbenzene is removed from the first hydrocarbon mixture by cooling said mixture to about 25° C. and separating the tetraisopropylbenzene crystalline product from the hydrocarbon mother liquor and wherein said mother liquor is fractionated to remove hydrocarbons boiling above tetraisopropylbenzene and a tetraisopropylbenzene fraction.

3. The proces of claim 2 including the additional step of combining with said hydrocarbon mother liquor the bottom fraction boiling above diisopropylbenzenes obtained from the second hydrocarbon mixture originating from said second propylation zone.

4. The process of claim 1 including the step of combining the bottom fraction boiling above diisopropylbenzenes obtained by fractionating the second hydrocarbon mixture with the hydrocarbon boiling below tetraisopropylbenzene obtained from the hydrocarbon mixture from said first propylation zone to form a third hydrocarbon mixture and fractionating said third hydrocarbon mixture in to at least a diisopropylbenzene stream and a triisopropylbenzene product.

5. The process of claim 4 including the additional steps of combining the second diisopropylbenzene fraction and the diisopropylbenzene fraction obtained by fractionating the second hydrocarbon mixture from said second propylation zone thereby forming a diisopropylbenzene composite and fractionating said composite of diisopropylbenzenes into a stream lean in para-isomer and rich in meta-isomer and a stream of high purity p-diisopropylbenzene from 93.5 to 96% purity.

6. The process of claim 1 wherein the modified BF$_3$·H$_2$O catalyst is with 2 to 15% acid soluble oils.

7. The process of claim 1 wherein the modified BF$_3$·H$_2$O catalyst is BF$_3$ hydrate containing 25 to 45% water by weight.

8. The process of claim 1 where in the catalyst for said second propylation zone is the BF$_3$·H$_2$O stream separated from the reaction mixture from said first propylation zone.

9. The process for producing high purity p-diisopropylbenzene which comprises reacting in a propylation zone an aromatic feed comprising benzene and hereinafter obtained cumene with propylene in the presence of modified BF$_3$·H$_2$O catalyst, selected from the class consisting of a BF$_3$·H$_2$O catalyst in addition with soluble oils, a BF$_3$·H$_2$O catalyst in addition with a diolefin, and a $BF_3 \cdot H_2O$ catalyst diluted with additional water, in the ratio of 0.25 to 1.0 mole of catalyst per mole of aromatics at a temperature in the range of from 25 to 75° C. with an isopropyl affording group ratio of from 1 to 2 moles per mole equivalent of benzene in the aromatic feed at such a propylene feed rate that there is no pressure buildup within said propylation zone withdrawing a mixture of hydrocarbons and $BF_3 \cdot H_2O$ containing catalyst from said propylation zone, separating said mixture into a hydrocarbon stream and $BF_3 \cdot H_2O$ containing catalyst stream, separating by fractionation a cumene fraction, a diisopropylbenzene fraction and a fraction boiling above diisopropylbenzenes from said hydrocarbon stream, recycling cumene to said propylation zone and separating by fractionation p-diisopropylbenzene of a purity in the range of 93.5 to 96% from said diisopropylbenzene fraction.

References Cited by the Examiner
UNITED STATES PATENTS

| | | | |
|---|---|---|---|
| 2,881,227 | 4/59 | De Keiser | 260—671 |
| 2,883,438 | 4/59 | Egbert | 260—671 |
| 3,046,315 | 7/62 | Dimond | 260—671 |

ALPHONSO D. SULLIVAN, *Primary Examiner.*